(12) United States Patent
Golin et al.

(10) Patent No.: US 9,080,487 B2
(45) Date of Patent: Jul. 14, 2015

(54) REDUCTANT INJECTION CONTROL SYSTEM

(71) Applicant: Tenneco Automotive Operating Company Inc., Lake Forest, IL (US)

(72) Inventors: Michael Golin, Dexter, MI (US); John DeGeorge, Michigan Center, MI (US); Guanyu Zheng, Novi, MI (US); Adam J. Kotrba, Laingsburg, MI (US)

(73) Assignee: Tenneco Automotive Operating Company, Inc., Lake Forrest, IL (US)

( * ) Notice: Subject to any disclaimer, the term of this patent is extended or adjusted under 35 U.S.C. 154(b) by 97 days.

(21) Appl. No.: 13/690,090

(22) Filed: Nov. 30, 2012

(65) Prior Publication Data

US 2014/0150411 A1    Jun. 5, 2014

(51) Int. Cl.

| | |
|---|---|
| F01N 3/00 | (2006.01) |
| F01N 3/10 | (2006.01) |
| F01N 3/20 | (2006.01) |
| F01N 9/00 | (2006.01) |
| F01N 3/025 | (2006.01) |
| F01N 3/035 | (2006.01) |
| F01N 13/00 | (2010.01) |

(52) U.S. Cl.
CPC ............. *F01N 3/106* (2013.01); *F01N 3/025* (2013.01); *F01N 3/035* (2013.01); *F01N 3/208* (2013.01); *F01N 9/002* (2013.01); *F01N 13/0097* (2014.06); *F01N 13/017* (2014.06); *F01N 2610/02* (2013.01); *F01N 2900/1404* (2013.01); *F01N 2900/1411* (2013.01); *Y02T 10/24* (2013.01); *Y02T 10/47* (2013.01)

(58) Field of Classification Search
USPC .......... 60/274, 286, 287, 288, 292, 295, 297, 60/301, 303
See application file for complete search history.

(56) References Cited

U.S. PATENT DOCUMENTS

| | | | |
|---|---|---|---|
| 4,791,785 A | 12/1988 | Hudson et al. | |
| 4,945,722 A | 8/1990 | Goerlich | |
| 5,390,492 A | 2/1995 | Levendis | |
| 5,974,791 A | 11/1999 | Hirota et al. | |
| 6,105,365 A | 8/2000 | Deeba et al. | |
| 6,742,328 B2 | 6/2004 | Webb et al. | |
| 6,820,414 B2 | 11/2004 | Stroia et al. | |
| 6,820,417 B2 * | 11/2004 | May et al. | 60/297 |
| 7,025,810 B2 * | 4/2006 | Crawley et al. | 95/278 |
| 7,234,295 B2 | 6/2007 | Goodfellow | |
| 7,900,441 B2 | 3/2011 | Mital et al. | |
| 7,984,608 B2 | 7/2011 | Roozenboom | |
| 8,028,514 B2 * | 10/2011 | Niimi et al. | 60/286 |
| 8,042,328 B2 * | 10/2011 | Ono | 60/301 |
| 8,079,213 B2 * | 12/2011 | Tsujimoto et al. | 60/295 |
| 8,234,855 B2 * | 8/2012 | Toyama et al. | 60/286 |
| 2008/0141663 A1 | 6/2008 | Ono | |
| 2008/0261801 A1 | 10/2008 | Gidney et al. | |
| 2011/0126524 A1 | 6/2011 | Askew | |

FOREIGN PATENT DOCUMENTS

WO    WO 2012-058056    5/2012

* cited by examiner

*Primary Examiner* — Binh Q Tran
(74) *Attorney, Agent, or Firm* — Harness, Dickey & Pierce, P.L.C.

(57) ABSTRACT

An exhaust system including a plurality of exhaust treatment devices, plurality of injectors for dosing an exhaust treatment fluid into an exhaust stream, and a controller for controlling each of the plurality of injectors. The controller actively controls an amount of exhaust treatment fluid dosed into the exhaust stream by each of the plurality of injectors based on at least one of an exhaust flow rate and a temperature of the exhaust stream.

17 Claims, 4 Drawing Sheets

|     | Leg 1 Temp | Leg 2 Temp | Leg 3 Temp |
| --- | --- | --- | --- |
| T0  | 350C | 350C | 350C |
| T1  | 650C | 650C | 650C |
| T2  | 550C | 650C | 550C |
| T3  | 350C | 350C | 350C |

REDUCTANT INJECTION CONTROL SYSTEM

FIELD

The present disclosure relates to an exhaust treatment fluid injection control system.

BACKGROUND

This section provides background information related to the present disclosure which is not necessarily prior art.

Combustion engines are known to produce emissions that may be harmful to the environment. In an effort to decrease the environmental impact that an engine may have, exhaust after-treatment systems have undergone comprehensive evaluation and development. Various components that assist in treating engine emission include oxidation and reduction catalysts. Dependent on the size of the engine application, the cost of these components can increase greatly. In this regard, larger engine applications such as locomotive, marine, and large horsepower stationary applications can produce substantially more exhaust emissions than, for example, a tractor trailer engine application. The exhaust after-treatment systems, therefore, are generally larger in scale to satisfactorily reduce the harmful emissions produced by these large-scale applications. As the scale of the after-treatment system increases, however, the cost to produce, install, and service such a system increases greatly. It is desirable, therefore, to produce an exhaust after-treatment system that is more conventional in scale, while still being able to reduce the effects of harmful emissions emitted by large engine applications.

SUMMARY

This section provides a general summary of the disclosure, and is not a comprehensive disclosure of its full scope or all of its features.

The present disclosure provides an exhaust system including a plurality of exhaust treatment devices, plurality of injectors for dosing an exhaust treatment fluid into an exhaust stream, and a controller for controlling each of the plurality of injectors. The controller actively controls an amount of exhaust treatment fluid dosed into the exhaust stream by each of the plurality of injectors based on at least one of an exhaust flow rate and a temperature of the exhaust stream.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a chart depicting exemplary monitored temperatures in the exhaust system of FIG. 2 and;

Corresponding reference numerals indicate corresponding parts throughout the several views of the drawings.

DETAILED DESCRIPTION

Example embodiments will now be described more fully with reference to the accompanying drawings.

Figure 1:
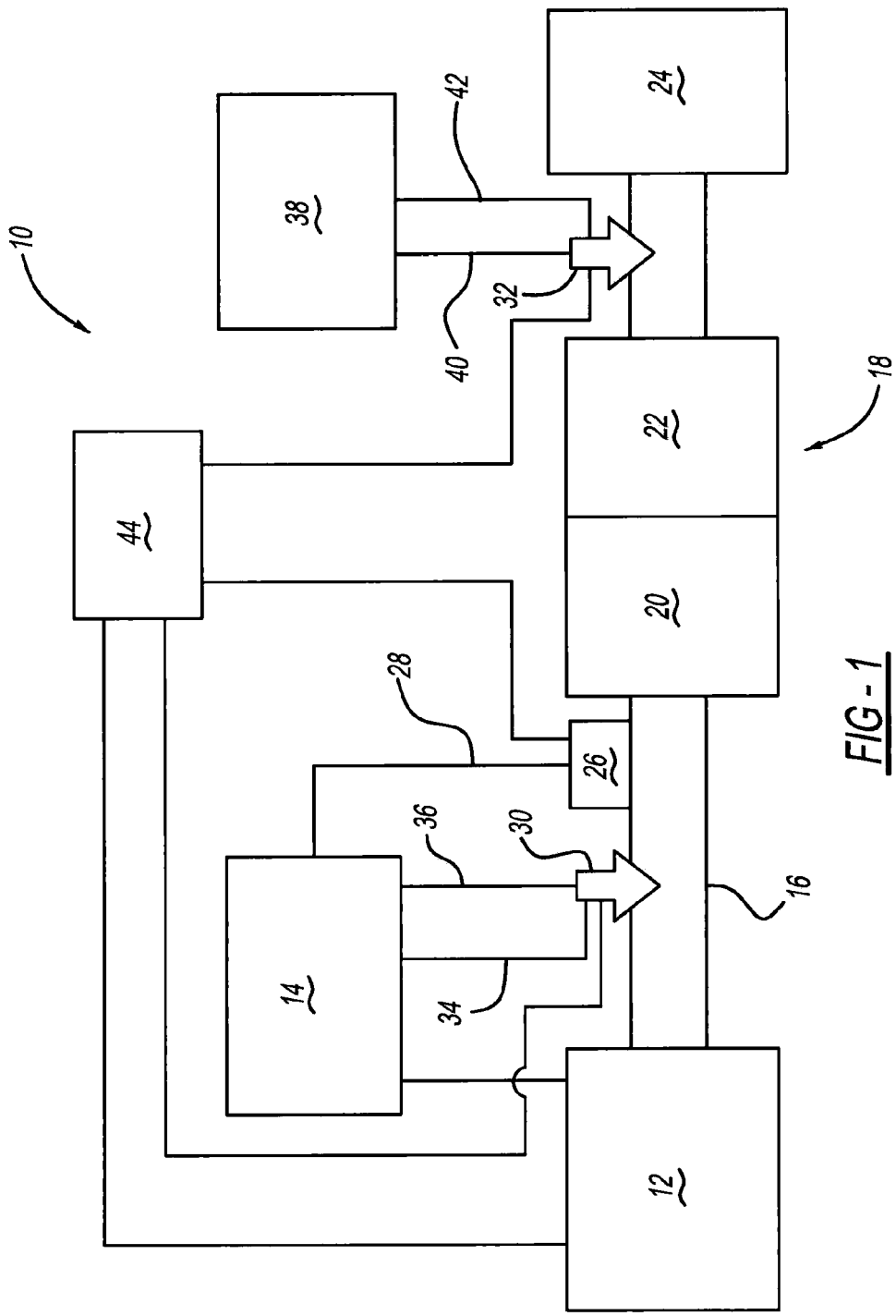
FIG. 1 is a schematic representation of an exhaust system according to a principle of the present disclosure.

FIG. 1 is a schematic representation of an exhaust system 10 according to the present disclosure. Exhaust system 10 includes at least an engine 12 in communication with a fuel source 14 that, once consumed, will produce exhaust gases that are discharged into an exhaust passage 16 having an exhaust after-treatment system 18. Exhaust after-treatment system 18, in general, is located downstream from engine 12 and may include a diesel oxidation catalyst (DOC) component 20, a diesel particulate filter (DPF) component 22, and a selective catalytic reduction (SCR) component 24. Exhaust after-treatment system 18 may further include components such as a thermal enhance device or burner 26 to increase a temperature of the exhaust gases passing through exhaust passage 16. Increasing the temperature of the exhaust gas is favorable to achieve light-off of the catalyst in DOC and SCR components 20 and 24 in cold-weather conditions and upon start-up of engine 12, as well as initiate regeneration of DPF 22 when required. To provide fuel to burner 26, the burner can include an inlet line 28 in communication with fuel source 14.

DPF 24 may be desired as an exhaust treatment component to filter soot and any other particulate matters present in exhaust 14. When soot and the other particulate matter begins to clog the tiny pores (not shown) of the DPF 24, however, the DPF 24 can be cleaned (i.e., regenerated) by raising the temperature of the exhaust to burn off the excess soot and particulate matter from DPF 24. For the above reasons, burner 26 is preferably located upstream from each of DOC 20, SCR 24, and DPF 22. It should be understood, however, that DPF 22 may be located upstream of both DOC 20 and SCR 24 and include its own designated burner for regeneration purposes, while a second burner (not shown) can be located upstream of both DOC 20 and SCR 24. Another alternative is for each of DOC 20, SCR 24, and DPF 22 to include a designated burner.

To assist in reduction of the emissions produced by engine 12, exhaust after-treatment system 18 can include injectors 30 and 32 for periodically injecting exhaust treatment fluids into the exhaust stream. As illustrated in FIG. 1, injector 30 can be located upstream of DOC 20 and is operable to inject a hydrocarbon exhaust treatment fluid that assists in at least reducing $NO_X$ in the exhaust stream. In this regard, injector 30 is in fluid communication with fuel source 14 by way of inlet line 34 to inject a hydrocarbon such as diesel fuel into the exhaust passage 16 upstream of DOC 20. Injector 30 can also be in communication with fuel source 14 via return line 36. Return line 36 allows for any hydrocarbon not injected into the exhaust stream to be returned to fuel source 14. Flow of hydrocarbon through inlet line 34, injector 30, and return line 36 also assists in cooling injector 30 so that injector 30 does not overheat. Other types of cooling, however, are contemplated. For example, injector 30 can be provided with a cooling jacket (not shown) where coolant can be passed through to cool injector 30.

Injector 32 can be used to inject an exhaust treatment fluid such as urea into exhaust passage 16 at a location upstream of SCR 24. Injector 30 is in communication with a reductant tank 38 via inlet line 40. Injector 32 also is in communication with tank 38 via return line 42. Return line 42 allows for any urea not injected into the exhaust stream to be returned to tank 38. Similar to injector 30, flow of urea through inlet line 40, injector 32, and return line 42 also assists in cooling injector 32 so that injector 32 does not overheat. Injector 32, however, can also be provided with a cooling jacket (not shown) in a manner similar to injector 30.

A controller 44 may be provided to control various features of exhaust system 18, including engine 12 and exhaust treatment system 18. Specifically, with respect to controlling elements of exhaust treatment system 18, controller 44 may be operable to control burner 26 and injectors 30 and 32. To control each of these elements, various sensors (not shown) may be disposed at positions throughout exhaust treatment system 18 to monitor, for example, exhaust temperature, NOx concentration, pressure, flow rate, exhaust treatment fluid temperature and pressure, and the like.

Large-scale diesel engines used in locomotives, marine applications, and stationary applications can have exhaust flow rates that exceed the capacity of a single exhaust line, like that schematically illustrated in FIG. 1. Accordingly, exhaust system 10 can be designed to include an exhaust after-treatment system that is a multi-leg system having a plurality of exhaust lines, with each of the exhaust lines having a DOC 20, DPF 22, and SCR 24. An exemplary multi-leg exhaust after-treatment system 50 is schematically illustrated in FIG. 2.

Accordingly, although only a single injector 30 is illustrated for hydrocarbon injection and only a single injector 32 is illustrated for urea injection, it should be understood that multiple injectors for both hydrocarbon and urea injection are contemplated by the present disclosure.

In large engine applications such as locomotive, marine, and stationary applications, the production of various exhaust treatment components may be cost prohibitive due to the scale necessary to effectively treat the large amount of exhaust produced during operation of engine 12. In this regard, the ceramic substrates of, for example, the DOC 20, DPF 22, and SCR 24 can be very expensive to produce. When produced in very large sizes, the DOC 20, DPF 22, and SCR 24 can be extremely expensive to produce. For this reason, instead of making large-scale exhaust treatment components commensurate in size with the large engine application, the exhaust flow can be divided into a plurality of exhaust passages 16 that each include a burner 26, DOC 20, DPF 22, and SCR 24 element that are more conventional in scale.

Figure 2:
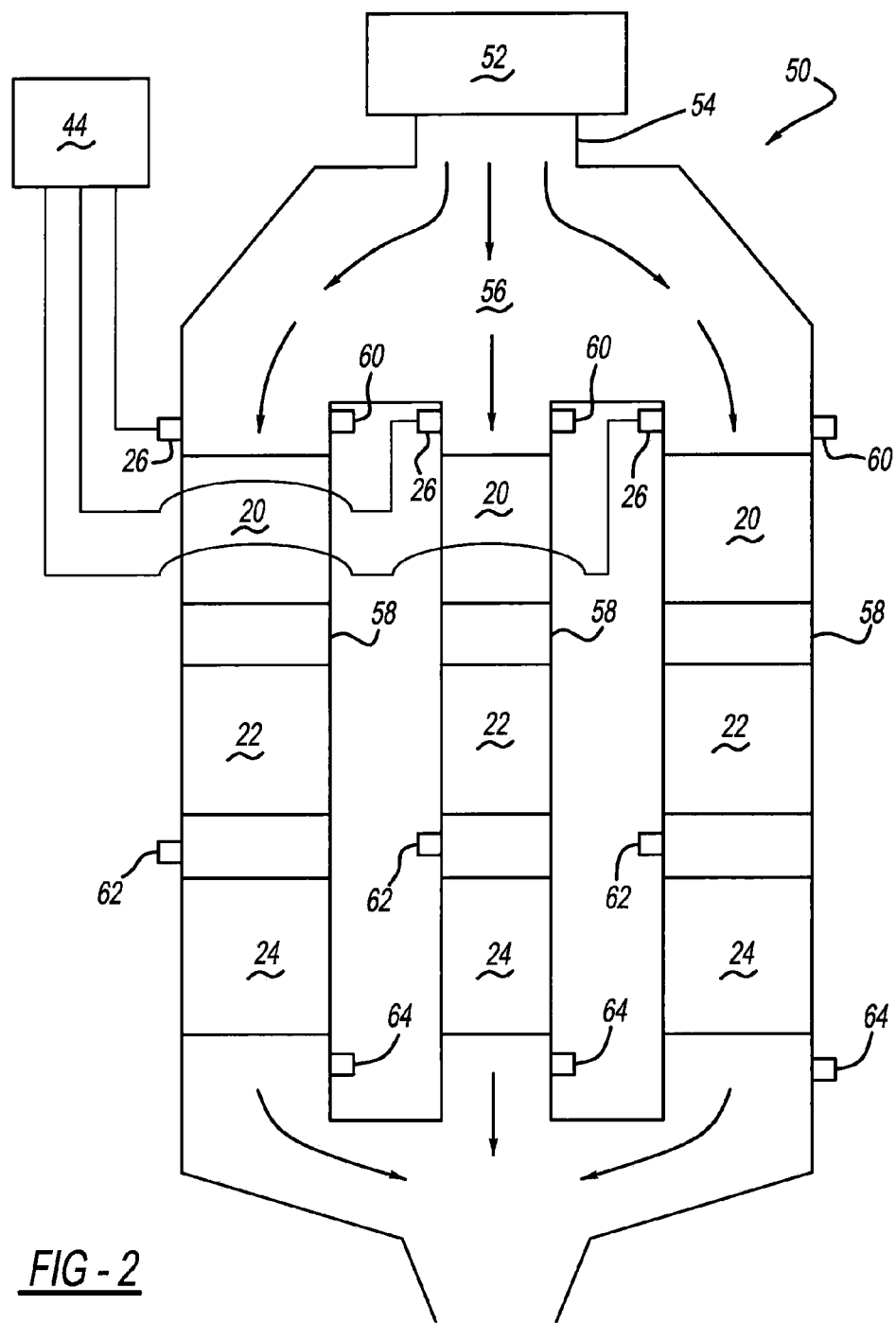
FIG. 2 is a schematic view of an exhaust system according to a principle of the present disclosure.

FIG. 2 schematically illustrates a multi-leg exhaust after-treatment system 50. Multi-leg exhaust after-treatment system 50 is in communication with a large-scale engine 52 that produces relatively large mass flow rates of exhaust. Large-scale engine 52 can be an engine used in, for example, locomotive, stationary, and marine applications. Exhaust produced by engine 52 enters an exhaust passage 54 that may include a turbo manifold 56. At turbo manifold 56, the exhaust can be divided into a plurality of legs 58. It should be understood that although only three legs 58 are illustrated in FIG. 2, the present disclosure should not be limited thereto. In this regard, multi-leg exhaust treatment system 50 can include a pair of legs 58, or a number of legs 58 greater than the three illustrated in FIG. 2. Further, although the above description references large-scale engines that produce large amounts of exhaust, the present disclosure is equally applicable to smaller-scale engines used on, for example, passenger vehicles, tractors, and the like.

Each leg 58 can be configured to include a DOC 20, a DPF 22, and a SCR 24. Furthermore, each leg 58 can include a respective burner 26 for increasing a temperature of the exhaust stream to achieve light-off of catalysts in DOC 20 and SCR 24, as well as regenerate DPF 22, when necessary. Additionally, each leg 58 can include injectors (not shown) for injecting exhaust treatment fluids such as hydrocarbon and urea treatment fluids at positions upstream of DOC 20 and SCR 24, respectively. Lastly, similar to after-treatment system 18, each injector, as well as each burner 26 can be in communication with controller 44 that is operable to control injection of the exhaust treatment fluids into the exhaust stream, as well as control operation of burner 26 for each leg 58.

Controller 44 allows for strict operational control of multi-leg exhaust after-treatment system 50. In some applications like locomotive, every increase and decrease in engine output can be predicted in advance by knowing the particular route upon which the locomotive will travel. For example, by knowing the particular route upon which the locomotive will travel, any grade change (e.g., change in elevation) upon the track will be known in advance. With this information, controller 44 can be programmed to recognize that an increase in engine output will be experienced at locations of increasing elevation, and that a decrease in engine output will be experienced at locations of decreasing elevation. With this knowledge, controller 44 can be operable to control after-treatment of the engine exhaust in a more active manner.

For example, if a locomotive is approaching a location of increasing elevation, controller 44 can be operable to predict that increased exhaust output will be experienced during increased engine output to accommodate for the increasing elevation. Controller 44, predicting that increased engine exhaust output is forthcoming, can proactively increase dosing of the exhaust treatment fluids into the exhaust stream by injectors 30 and 32.

Alternatively, if the locomotive is approaching a location of decreasing elevation, controller 44 can be operable to predict that decreased exhaust output will be experienced during decreased engine output. Controller 44 can then proactively decrease dosing of the exhaust treatment fluids into the exhaust stream by injectors.

It should be understood that controller 44 should not be limited to proactive control over multi-leg exhaust treatment system 50. In contrast, it should be understood that controller 44 may be operable to control multi-leg exhaust treatment system 50 in a real-time manner as well. For example, multi-leg exhaust treatment system 50 can include a plurality of sensors including, for example, temperature sensors 60, pressure sensors 62, and $NO_X$ sensors 64 at various positions throughout multi-leg exhaust treatment system 50 that actively communicate with controller 44. Based on data received from each of sensors 60, 62, and 64, controller 44 may control burner 26 to increase a temperature of the exhaust to achieve light-off of the catalysts in DOC 20 and SCR 24, or may control burner 26 to regenerate DPF 24. Also, controller 44 can increase or decrease dosing of the exhaust treatment fluids in response to data received from $NO_X$ sensor 64. Moreover, controller 44 can be used to diagnose faults or errors in exhaust treatment system 50. Regardless, it should be understood that controller 44 can be used in proactive and reactive manners to control exhaust after-treatment system 50.

An example of controlling active regeneration of DPFs 22 using controller 44 in multi-leg exhaust treatment system 50 will now be described. Controller 44 is operable to receive temperature data from temperature sensors 60 and monitor exhaust temperatures over time. In general, it is preferable to keep each leg 58 of exhaust treatment system 50 at approximately the same temperature. For example, referring to FIG. 3, it may be preferable to keep each leg 58 at a temperature of 350 C to maintain proper light-off of the catalysts of DOC 20 and SCR 24 (T0). If controller 44 determines that DPFs 22 should be regenerated (based on pressure sensor readings or the like), controller 44 will instruct each burner 26 to simultaneously increase the exhaust temperature to, for example, 650 C to regenerate DPFs 22 (T1).

As burners 26 operate to regenerate DPFs 22, controller 44 may determine that at least one of DPFs 22 has been sufficiently regenerated, but the remaining DPFs 22 have not sufficiently regenerated. In response to this determination, controller 44 can decrease operation of burner 26 in leg(s) 58 where the regenerated DPF(s) 22 are located (i.e., legs 1 and 3 in FIG. 3), while the remaining burner 26 in leg 2 (FIG. 3) can continue operation to regenerate the remaining DPF 22 (T2). This process of reducing operation of burners 26 for DPFs 22 that have been regenerated can continue until each DPF 22 is fully regenerated. After regeneration of each DPF 22, controller 44 can instruct each burner 26 to return to normal operation to lower the exhaust temperature to any desired level (e.g., 350 C) (T3). By controlling burners 26 in this manner, a fuel savings can be achieved in that burners 26 are not operating at a higher capacity to regenerate a DPF 22 when no regeneration is required.

Moreover, controlling burners 26 in each leg 58 in this manner can manipulate the mass flow of exhaust through each leg 58. More particularly, in temperatures in each leg 58 can influence the mass flow of exhaust due to the temperature in each leg 58. For example, if the temperature in one leg 58 is significantly lower than the temperature in another leg 58, a greater mass of the exhaust will tend to flow into the leg 58 that is at the lower temperature. More specifically, as the exhaust enters the cooler leg, the temperature of the exhaust will lower in temperature, which will increase the density of the exhaust. Because the exhaust will be at a lower density, a greater mass of exhaust per cubic foot can travel through the cooler leg in comparison to the leg 58 that is at a higher temperature. In other words, the mass flow rate through a cooler leg 58 is greater than the mass flow rate through a warmer leg 58. Accordingly, by using the control methodology set forth above where the temperature in the leg 58 that has already been regenerated is kept elevated can ensure that substantially equal masses of exhaust will enter each leg 58 while the regeneration process continues in the remaining legs 58.

To be clear, as burners 26 are operating to regenerate DPFs 22 and controller 44 has determined that at least one of DPFs 22 has been sufficiently regenerated, but the remaining DPFs 22 have not sufficiently regenerated, the controller 44 can decrease operation of burner 26 in leg 58 where the regenerated DPF 22 is located, while the remaining burners 26 can continue operation to regenerate the remaining DPFs 22 (T2). The operation of burner 26 where the regenerated DPF is located is only reduced (instead of being turned off) to maintain a sufficient mass flow of exhaust through the leg 58 where the regenerated DPF 22 is located. Again, if the temperature in a leg 58 is too low in comparison to the other legs 58, the exhaust may tend to flow toward the lower-temperature legs (i.e., the legs where regeneration temperatures are no longer being experienced). By maintaining the leg 58 where the regenerated DPF 22 is located at an elevated (albeit reduced) temperature, the substantially equal mass flow of exhaust through each leg 58 can be maintained. Once each DPF 22 is sufficiently regenerated, each burner 26 can be returned to normal operation to lower exhaust temperatures as needed (i.e., to T3 where each leg is at about 350 C).

As an alternative to using burners 26 to raise temperatures in each leg 58, it should be understood that the dosing of hydrocarbon exhaust treatment fluid into each leg 58 can also be used to manipulate the temperature of the exhaust in each leg 58. More specifically, if one leg 58 is at a reduced temperature in comparison to other legs 58, controller 44 can instruct injectors 30 associated with the lower-temperature leg 58 to increase dosing of hydrocarbon exhaust treatment fluid into the lower-temperature leg 58 to increase the exhaust temperature in that leg, or controller 44 can instruct injectors 30 in the higher-temperature legs 58 to decrease dosing of hydrocarbon exhaust treatment fluid into the higher-temperature legs 58 to lower the exhaust temperature in each leg. Regardless, it should be understood that the mass flow of exhaust through each leg 58 can be manipulated based on the temperature in each leg 58.

Figure 4:
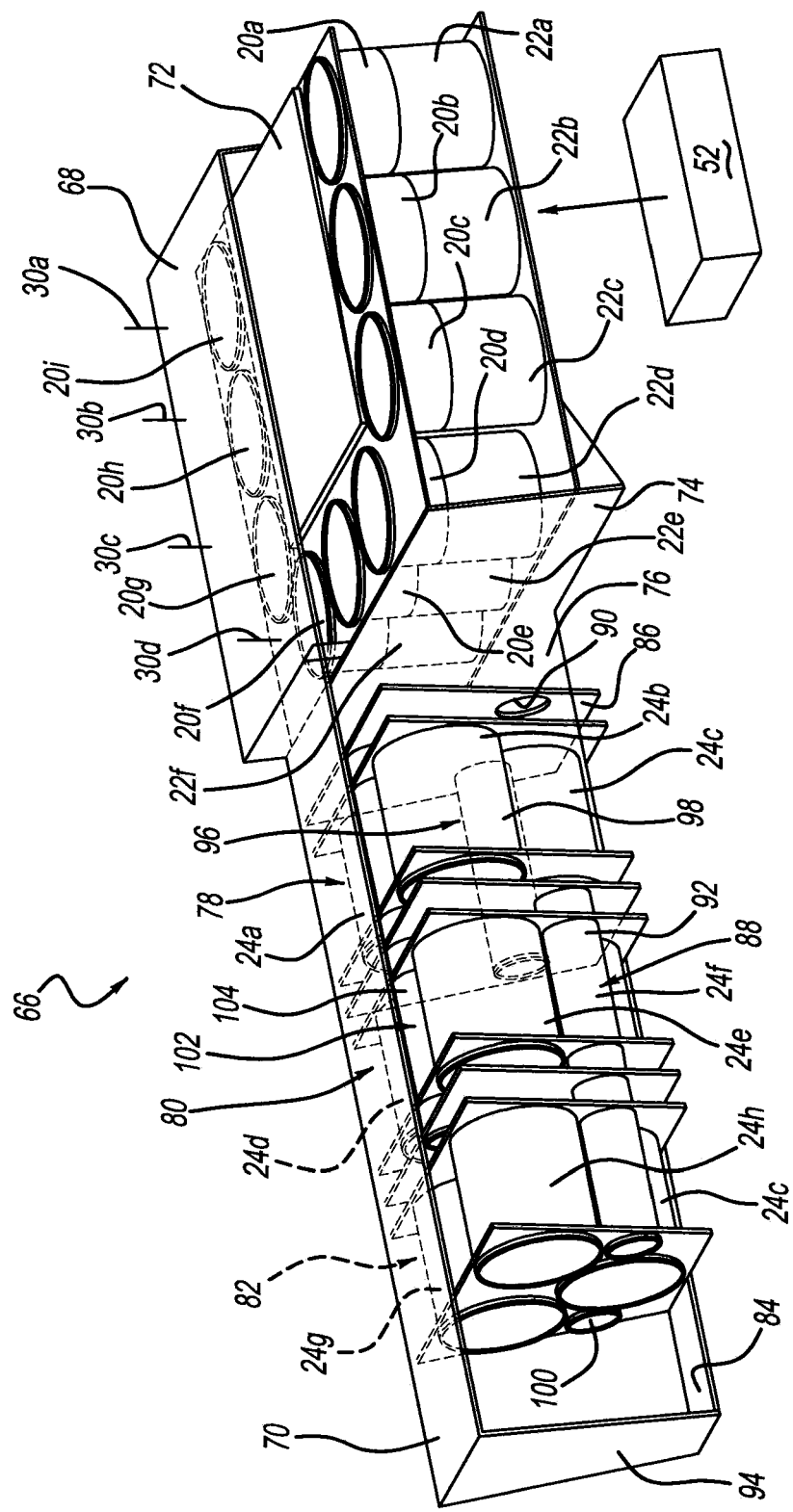
FIG. 4 is a schematic representation of an exhaust system according to a principle of the present disclosure.

Now referring to FIG. 4, another exemplary exhaust treatment system 66 is illustrated. Exhaust after-treatment system 66 includes a first housing 68 positioned in fluid communication with a second housing 70. First housing 68 includes an inlet 72 in communication with one or more combustion cylinders of an engine 12. In the illustrated embodiment, exhaust after-treatment system 66 is generally formed over top of engine 12 such that exhaust produced by engine 12 will flow upwards into inlet 72 from engine 12.

First housing 68 contains a plurality of DOCs 20a to 20i, and has the configuration of an isothermal box. Each DOC 20a to 20i may correspond to a DPF 22a to 22f (with only DPFs 22a to 22f being illustrated). As noted above, exhaust will enter housing 68 through inlet 72. As exhaust enters housing 68 through inlet 72, the exhaust will spread over each of DOCs 20a to 20i, and pass through DOCs 20a to 20i and, subsequently, DPFs 22a to 22i in a top-down direction as viewed in FIG. 4. As such, each of DOCs 20a to 20i and each of DPFs 22a to 22i are positioned in parallel and include an upstream end in communication with exhaust provided from the internal combustion engine 12. Each of DPFs 22a to 22i includes an outlet or downstream end positioned in parallel with the other diesel particulate filter outlets. A collector 74 is in receipt of the exhaust that passes through each of DPFs 22a-22i.

An inlet 76 of second housing 70 is in communication with collector 74. A plurality of SCRs 24a-24i are positioned within second housing 70. More particularly, SCR 24a, 24b and 24c define a first SCR array 78. SCRs 24d, 24e and 24f form a second SCR array identified at reference numeral 80. SCRs 24g, 24h and 24i form a third SCR array 82. First array 78, second array 80 and third array 82 are axially spaced apart from one another within second housing 70. As will be described, the SCR arrays 78, 80, and 82 are interconnected in parallel such that exhaust from collector 74 flows through three parallel passageways prior to rejoining at an end portion 84 of second housing 70. Furthermore, the three SCRs within each SCR array are positioned in parallel with one another.

As supplied from collector 74, exhaust enters inlet 76 of second housing 70. A plate 86 is positioned within second housing 70 to direct exhaust from inlet 76 to one of three passageways. A first passageway 88 includes an aperture 90 extending through plate 86 to allow exhaust to travel through plate 86 into communication with upstream ends of SCRs 24a, 24b and 24c. Once this portion of the exhaust passes through the parallel SCRs of first array 78, the exhaust travels through a bypass portion or first tube 92 of first passageway 88. More particularly, an upstream end of first tube 92 and downstream ends of SCRs 24a, 24b, 24c are in communication with each other. The downstream end of first tube 92 is in communication with end portion 84 and outlet 94 of second housing 70.

A second passageway 96 provides exhaust gas from collector 74 to second array 80 via a bypass portion or second tube 98. Another bypass portion identified as a third tube 100 includes an upstream end in communication with the downstream ends of SCRs 24d, 24e and 24f. A downstream end of third tube 100 transfers this portion of the exhaust flow to outlet 94.

A third passageway 102 provides a path for exhaust travelling from collector 74 through third SCR array 82 and exiting at outlet 94. Third passageway 102 includes a bypass portion or fourth tube 104 having an inlet or upstream end passing through plate 86 and a downstream end positioned in fluid communication with upstream ends of SCRs 24g, 24h and 24i. The downstream ends of the SCRs within third SCR array 82 are in communication with outlet 94. Exhaust flowing through fourth tube 104 does not pass through any of the SCRs of first array 78 or second array 80. Similarly, exhaust flowing through first passageway 88 passes through only the SCRS of first SCR array 78 and bypasses the SCRs of second array 80 and third array 82. The parallel path of second passageway 96 provides exhaust only to the SCRs of second SCR array 80. It should be appreciated that through the use of exhaust treatment device arrays, compartmentalization and parallel pathways, a relatively high flow exhaust system including multiple exhaust treatment devices may be provided in a minimal volume.

In a manner similar to exhaust after-treatment system 50, exhaust after-treatment system 66 can include a plurality of injectors 30 and 32 that correspond to each DOC 20 and SCR 24, respectively, that are controlled by controller 44. Although each DOC 20 and SCR 24 can include its own injector 30 or 32, controller 44 can be operable to actively adjust dosing rates of each injector 30 and 32 according to an amount of exhaust passing through (or projected to pass through) each DOC 20 and SCR 24.

More specifically, as exhaust enters inlet 72, computational flow dynamics (CFD) has determined that the exhaust does not necessarily flow evenly to each of the DOCs 20. In contrast, exhaust may be more apt to enter, for example, DOCs 20a, 20b, 20h, and 20i before entering DOCs 20c to 20g. In particular, two-thirds of the exhaust may enter DOCs 20a, 20b, 20h, and 20i, with only a third of the exhaust entering DOCs 20c to 20g. With this in mind, controller 44 can be used to adjust the amount of exhaust treatment fluid released from each injector 30 based on a flow rate of exhaust that travels to each DOC 20.

Flow rates for each DOC 20 can be determined using mass flow sensors (not shown) located either upstream or downstream of each DOC 20. Alternatively, flow rates for each DOC 20 can be determined through testing of exhaust system 66 before being installation. Regardless, it should be understood that each injector 30 can be actively controlled using control 44 to provide the appropriate amount of exhaust treatment fluid to properly treat the exhaust stream.

For example, during use of exhaust treatment system 66 and because the exhaust generated by engine 12 may be more apt to enter DOCs 20a, 20b, 20h, and 20i, the injectors for these DOCs (i.e., injectors 30a and 30b as illustrated in FIG. 4), can be actuated more frequently to dose exhaust treatment fluid into the exhaust stream before the exhaust enters DOCs 20a, 20b, 20h, and 20i. In contrast, because the exhaust generated by engine 12 may be less apt to enter DOCs 20c to 20g, the injectors for these DOCs (i.e., injectors 30c and 30d as illustrated in FIG. 4), can be actuated less frequently to dose exhaust treatment fluid into the exhaust stream before the exhaust enters DOCs 20c to 20g. In this manner, the exhaust treatment fluid is dosed in the appropriate amount which increases efficiency of exhaust treatment system 66. Moreover, no unnecessary excess dosing of exhaust treatment fluid is conducted to the exhaust at locations of the exhaust treatment system 66 that do not require it. Such a process conserves exhaust treatment fluid.

Injectors 30 can include pulse-width modulated (PWM) or mechanically actuated valves (not shown) that are controlled by controller 44. To adjust the amount of dosing of each injector 30, the injectors 30 can be actuated either simultaneously during periods of increased exhaust flow, or in a staggered manner during periods of decreased exhaust flow. For example, injectors 30a and 30b can be actuated simultaneously during high engine load operation, or be actuated in a staggered manner when exhaust flow is reduced. Injectors 30c and 30d can be operated in a similar manner.

Injectors 32 can be operated in a manner similar to injectors 30. Although not illustrated in FIG. 4, it should be understood that each SCR array 78, 80, and 82 can include an injector 32, or a bank of injectors 32 that corresponds to each SCR 24. Dependent on the amount of exhaust flow that enters each array 78, 80, and 82, the amount of exhaust treatment fluid injected into the exhaust stream by injectors 32 can be adjusted. It should be understood, however, that because SCR arrays 78, 80, and 82 are each axially aligned, the same flow dynamics are not present as at DOCs 20a to 20i. Accordingly, the injectors 32 for each SCR array 78, 80, and 82 are not necessarily actuated differently to dose different amounts of exhaust treatment fluid into the exhaust stream. Regardless, if mass flow is determined to vary between each SCR array 78, 80, and 82, controller 44 can be used to actively control injectors 32 in a manner similar to injectors 30 to ensure that the proper amount of exhaust treatment fluid is dosed into the exhaust stream to properly treat the exhaust.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust system, comprising:
   a plurality of exhaust treatment devices arranged in parallel flow paths;
   a plurality of injectors for dosing an exhaust treatment fluid into an exhaust stream located in the parallel flow paths;
   a thermal enhancement device provided in each parallel flow path; and
   a controller for controlling each of the plurality of injectors and each of the thermal enhancement devices,
   wherein the controller actively controls an amount of exhaust treatment fluid dosed into the parallel flow paths by each of the plurality of injectors based on an exhaust flow rate of the exhaust stream through each of the parallel flow paths, and
   the controller actively controls operation of each of the thermal enhancement devices based on a temperature of the exhaust stream in each of the parallel flow paths, wherein the controller actively controls the thermal enhancement devices to control a mass flow of the exhaust stream through the parallel flow paths.

2. The exhaust system of claim 1, wherein controlling a mass flow of the exhaust stream through the parallel paths includes maintaining a substantially equal mass flow rate of exhaust in each parallel flow path.

3. The exhaust system of claim 1, wherein exhaust treatment devices are particulate filters, and the controller controls each of the thermal enhancement devices to regenerate each of the particulate filters simultaneously.

4. The exhaust system of claim 3, wherein if one of the particulate filters located in one of the parallel flow paths has regenerated before the other particulate filters, the controller reduces operation of the thermal enhancement device corresponding to the one particulate filter to lower the temperature of the exhaust stream in the one parallel flow path.

5. An exhaust system, comprising:
a plurality of exhaust treatment devices arranged in parallel flow paths;
a plurality of injectors for dosing an exhaust treatment fluid into an exhaust stream located in the parallel flow paths; and
a controller for controlling each of the plurality of injectors, wherein each exhaust treatment device is an oxidation catalyst, the injectors injecting an amount of exhaust treatment fluid into the parallel flow paths based on a temperature of the exhaust stream in each parallel flow path to manipulate the mass flow rate of the exhaust stream in each parallel flow path and maintain substantially equal mass flow rates of exhaust flowing through each parallel flow path.

6. The exhaust system of claim 1, wherein the exhaust treatment device is either an oxidation catalyst or an selective reduction catalyst, and the controller actively controls the plurality of injectors associated with each parallel flow path based on the amount of exhaust entering each parallel flow path.

7. An exhaust system, comprising:
an exhaust flow path divided into a plurality of legs;
an exhaust treatment device disposed in each of the plurality of legs;
a thermal enhancement device located in each leg, and
a controller for controlling each thermal enhancement device based on a temperature of the exhaust stream in each of the legs, the thermal enhancement devices manipulating the exhaust flow rate through each of the legs to maintain substantially equal mass flow rates of exhaust through each leg.

8. The exhaust system of claim 7, wherein each exhaust treatment device is a particulate filter.

9. The exhaust system of claim 8, wherein the controller monitors the temperature in each leg during regeneration of the particulate filters with the thermal enhancement devices.

10. The exhaust system of claim 9, wherein the particulate filters are regenerated simultaneously.

11. The exhaust system of claim 10, wherein if one particulate filter is regenerated before the remaining particulate filters, the controller controls the thermal enhancement device that corresponds to the one particulate filter to reduce, but not cease, operation of the thermal enhancement device to maintain the temperature of the exhaust gas within the leg containing the regenerated particulate filter within a predetermined range of the temperature in the other legs.

12. An exhaust system, comprising:
a plurality of exhaust treatment devices arranged in an array in an exhaust passage;
a plurality of injectors disposed upstream of the exhaust treatment devices for dosing an exhaust treatment fluid into the exhaust passage, and
a controller for controlling actuation of each of the injectors based on one of a measured flow rate and an estimated flow rate of an exhaust stream passing through each of the exhaust treatment devices,
wherein the injectors that are associated with the exhaust treatment devices that receive a greater flow rate of exhaust are actuated to dose a greater amount of the exhaust treatment fluid into the exhaust passage than the injectors that are associated with the exhaust treatment devices that receive a lower flow rate of exhaust.

13. The exhaust system of claim 12, wherein the exhaust treatment devices are oxidation catalysts or reduction catalysts.

14. The exhaust system of claim 12, wherein the exhaust treatment devices are oxidation catalysts that include a particulate filter.

15. The exhaust system of claim 12, wherein the exhaust treatment devices include oxidation catalysts and reduction catalysts.

16. The exhaust system of claim 12, wherein the exhaust treatment devices are disposed in an isothermal box.

17. The exhaust system of claim 12, wherein the exhaust treatment devices are positioned in parallel.

* * * * *